Sept. 9, 1969  A. NAZARETH, JR  3,466,557
BALANCED DIRECT CURRENT AMPLIFIER WITH SOLID STATE CHOPPING MEANS
Filed Nov. 14, 1966
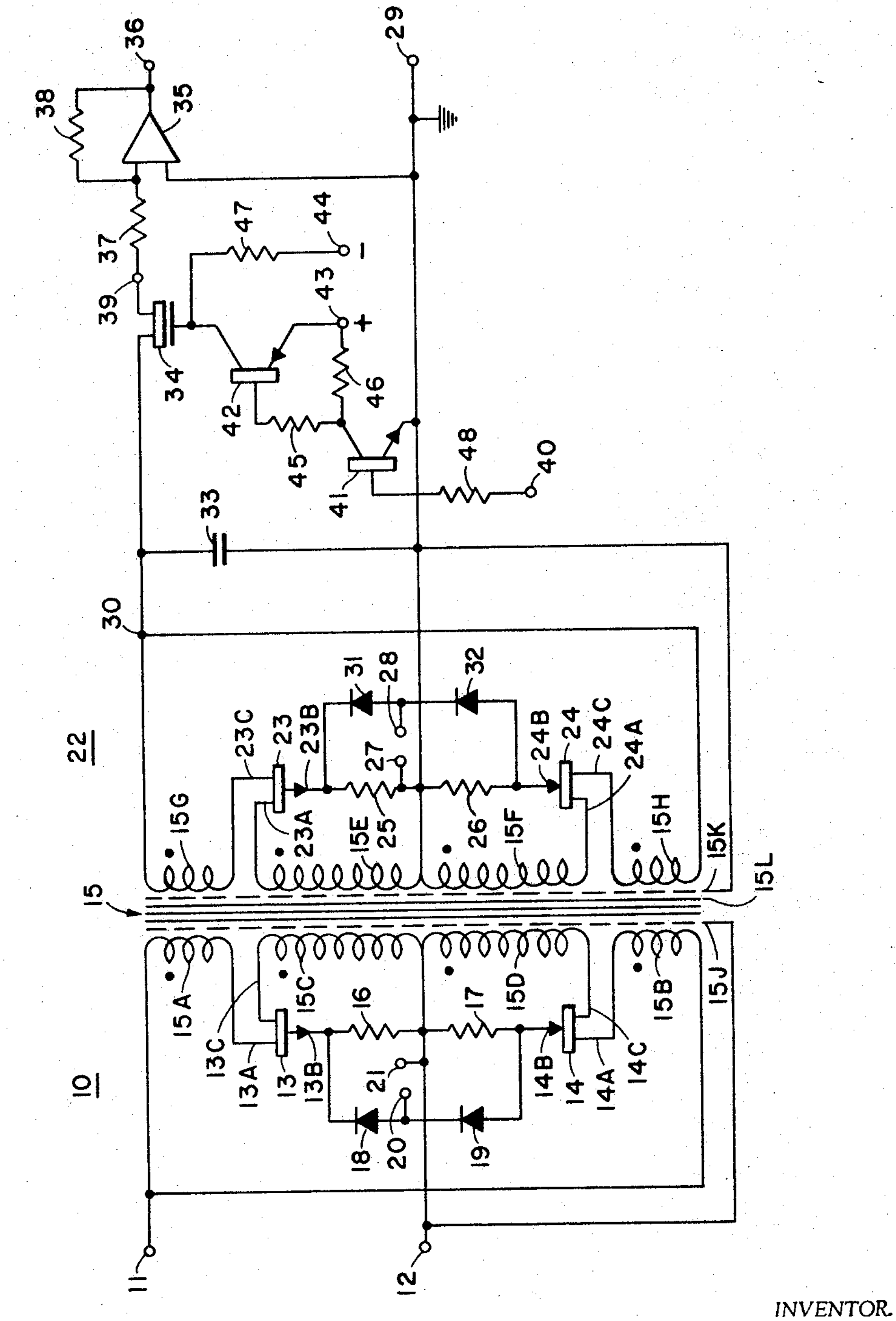
INVENTOR.
ALFRED NAZARETH JR.
BY David E. Hoppe
ATTORNEY 3,466,557

BALANCED DIRECT CURRENT AMPLIFIER WITH SOLID STATE CHOPPING MEANS

Alfred Nazareth, Jr., Rehoboth, Mass., assignor to The Foxboro Company, Foxboro, Mass., a corporation of Massachusetts Filed Nov. 14, 1966, Ser. No. 594,039
Int. Cl. H03f 3/38
U.S. Cl. 330—10 8 Claims

ABSTRACT OF THE DISCLOSURE

The invention is a direct current isolator employing a balanced solid state chopping means and including transformer isolation between signal input and output, with provision for substantial cancellation of chopping transients.

This invention relates to direct current amplifiers employing chopping means generally and more particularly to direct current isolators having extremely high isolation between signal input and output.

Chopper-type direct current amplifiers have long been used for the purpose of translating a direct current signal level into a usable range of outputs. Typicaly, a direct current signal is periodically interrupted by chopping means to thereby produce an alternating current signal having an amplitude proportional to the original direct current signal; the alternating current signal is amplified and then reconverted to a direct current, thereby producing a direct current output proportionally related to the original direct current input signal. Commonly, mechanical chopping devices have been used for the purpose of periodically interrupting the direct current input signal. Lately, field effect transistors have been employed for chopping purposes, for example, as described in U.S. patent application Ser. No. 452,618, by Nazareth and Cook.

For particular applications, such as multiplexing thermocouples to a common reading apparatus, it is desirable that very high signal isolation be maintained. The low level of the thermocouple sensing probe signal also makes it a requirement that transients introduced by the chopping process be held to a minimum. The present invention proposes a direct current isolator employing symmetrical complementary field effect transistors in circuit configuration with a transformer for providing a high degree of isolation between a floating input and an output conveniently referenced to a common potential with provision for substantially eliminating transients contributed by the chopping process.

FIGURE I is a schematic of the direct current isolator including demodulating and multiplexing provisions.

Referring now to FIGURE I, a low-level signal illustratively derived from an ungrounded thermocouple, is applied between input terminals 11 and 12 of chopper section 10. Chopper section 10 comprises complementary symmetrical field effect transistors 13 and 14 in circuit configuration with primary windings of transformer 15, resistors 16 and 17, and diodes 18 and 19. Field effect transistor 13 is a P-type and field effect transistor 14 is an N-type.

For purposes of description, each of the windings **15*a* through 15*h* of transformer 15** has one end designated by a dot in FIGURE I all the so-designated dotted ends being polarized in the same direction in relation to one another.

Input terminal 11 is connected to the dotted end of primary winding **15*a*, the other end of winding 15*a* being connected to source element 13*a* of P-type field effect transistor 13. Input terminal 11 is also connected to the undotted end of primary winding 15*b*, and the other end of winding 15*b* is connected to the source element of N-type field effect transistor 14**.

Drain element **13*c*, of transistor 13, is connected to the dotted end of primary winding 15*c*; drain element 14*c* of transistor 14 is connected to the undotted end of primary winding 15*d*. The other ends of primary winding 15*c* and 15*d* are connected together, and to this common connection is also connected input terminal 12. Terminal 12** is floating with respect to the common reference in the output system.

Gate element **13*b* of transistor 13 is connected through resistor 16 to terminal 12, and gate element 14*b* of transistor 14 is connected through resistor 17 to terminal 12. Gate element 13*b* is connected through diode 18 to chopper drive input terminal 20, and gate 14*b* is connected through diode 19 to the same chopper drive input terminal 20. The other chopper drive input terminal 21 is connected to terminal 12. An isolated A.C. square wave chopping signal is applied between terminals 20 and 21**.

The secondary windings **15*e*, *f*, *g*, and *h* of transformer 15 supply the demodulating section 22. The dotted end of secondary winding 15*e* is connected to source element 23*a* of P-type field effect transistor 23, and the undotted end of secondary winding 15*f* is connected to source element 24*a* of N-type field effect transistor 24. Field effect transistors 23 and 24 are symmetrical, that is, each has a gate-to-source capacity similar to its gate-to-drain capacity. The other ends of secondary winding 15*e* and 15*f* are connected together and also connected to output terminal 29, in this application illustratively connected to a ground reference. The drain element 23*c* of transistor 23 is connected to the undotted end of secondary winding 15*g*, the dotted end thereof being connected to demodulator section 22 output terminal 30. The drain element 24*c* of transistor 24 is connected to the dotted end of secondary winding 15*h*, the undotted end thereof being connected to output terminal 30**.

Gate **23*b* of transistor 23 is connected through diode 31 to demodulator drive terminal 28 and gate element 24*b* as connected through diode 32 to terminal 28. Gate 23*b* is connected through resistor 25 to demodulator drive terminal 27 and gate 24*b* is connected through resistor 26 to demodulator drive terminal 27. Terminal 27 is connected to the common output terminal 29. The demodulator A.C. square wave drive is applied between terminals 27 and 28**.

Demodulator output at terminal 30 is connected through multiplexing switch field effect transistor 34 to the input of amplifier 35. Input 39 of amplifier 35 illustratively has a plurality of multiplex switches 34 connected thereto, and a control signal applied to terminal 40 of the multiplex switch determines the one of the plurality of multiplex switches 34 is to be selected for applictaion to input 39 of amplifier 35.

The primary windings of transformer **15*a*, 15*b*, 15*c*, 15*d*, are shielded from the core 15L of transformer 15 by shielding 15*j*, which is electrically connected through terminal 12. Secondary winding 15*e*, *f*, *g*, and *h* of transformer 15 are shielded from core 15L by shield 15*k* which is electrically connected to terminal 29. Thereby, electrostatic shielding between primary windings and secondary windings of transformer 15 is effected, preventing coupling of transients electrostatically through transformer 15**.

Illustratively, an input potential from −10 to +10 millivolts may be applied between terminals 11 and 12. An A.C. square wave is applied between terminals 20 and 21 of chopper section 10. Illustratively when the square wave potential at terminal 20 is positive, diode 18 is forward biased and field effect transistors 13 is cut off by the positive potential at gate **13*b*; at this time, diode 19 is reverse-biased and field effect transistor 14 is on inasmuch as gate 14***b* has a zero potential thereon. Resistor 17 drains off any charge on gate 14*b*, so that gate 14*b* will have a zero potential while diode 19 is reverse-biased thus leaving transistor 14 on.

When the square-wave potential at terminal 20 is negative, diode 18 is reversed-biased and transistor 13 is on, while diode 19 is forward-biased and transistor 14 is cut off by the negative potential at gate 14*b*. In this case, resistor 16 drains any charge on gate 13*b*.

By this chopping action, the input current drawn from terminal 12 is alternately passed through primary windings 15*a*–15*c*, and windings 15*b*–15*d*. Thus the signal appearing on the primary windings of transformer 15 is an alternating current signal having a frequency equal to that of the chopping wave formed applied to terminals 20 and 21, and having an amplitude proportional to the D.C. level of the input signal applied to terminals 11 and 12.

Each of the primary windings 15*a*, *b*, *c*, and *d* transformer 15 have, as close as may be practicable, ¼ of the primary turns. The circuit configuration illustrated expedites the cancellation of transient spiking caused by chopper switching. The leading and trailing edges of the square wave chopper drive is fed through the inter-elements capacities of field effect transistors 13 and 14, appearing at their source and drain elements as spikes.

Field effect transistors 13 and 14 are each symmetrical, that is, have a symmetrical construction with respect to their gates so that the gate-to-source capacity is the same as the gate-to-drain capacity. The square wave applied between terminals 20 and 21 are applied to gate 13*b* thereof, is coupled to source element 13*a* through the gate-to-source capacity, and is also coupled to drain element 13*c* through the gate-to-drain capacity which is equal to the first capacity. The fast rise time of the square wave allows leading and trailing edges of the switching signal at gate 13*b* to be capacitively coupled to elements 13*a* and 13*c* of transistor 13.

A positive half-cycle of the A.C. chopper drive turns off P-type transistor 13 and turns on N-type transistor 14. The positive going leading edge of the half-cycle appearing at gate 13*b* causes positive spikes to be capacitively coupled to both source 13*a* and drain 13*c* of transistor 13. These spikes thereby appear at the undotted end of winding 15*a* and at the dotted end of winding 15*c* simultaneously. Since these positive spikes are coupled to primary windings 15*a* and 15*c* so that current flows in opposing directions, the spikes tend to cancel each other.

Transistor 14 is turned on while the chopper drive is positive and has a much smaller effective capacitive feed-through inasmuch as the source-to-drain impedance of transistor 14 is low at this time. It appears that the effective spiking feed-through for any turned on transistor is negligible. Be that the case, any capacitive feed-through tends to cancel at primary windings 15*b* and 15*d* in a manner similar to that previously described.

Referring to the negative half-cycle of the A.C. chopper drive, transistor 13 is turned on and transistor 14 is turned off during this time. The negative-going position of the chopper drive causes negative spikes to be capacitively coupled to source 14*a* and drain 14*c* of transistor 14. The negative spike appearing at the dotted end of primary winding 15*b* tends to cancel the negative spike appearing at the undotted end of primary winding 15*d*.

To the extent that the cancellation above described is not completely effected, the reduced positive and negative spikes (which are substantially equal) are coupled to the secondary windings of transformer 15, so that they appear at the output 30 of demodulator section 22, these spikes tend to be integrated toward zero by the action of capacitor 33.

The chopped D.C. signal is coupled from primary windings 15*a* to 15*d* to secondary windings 15*e* through 15*h*, the coupling being entirely inductive inasmuch as electrostatic shielding effectively separates the primary windings from the secondary windings. The secondary windings 15*e* through 15*h* are connected in an analogous circuit configuration to the circuit connection of the primary windings, with demodulating field effect transistors 23 and 24 operating to reconstitute the direct current signal. Each of winders 15*e* through 15*h* has as closely as maybe practicable one-quarter of the secondary turns. If the turns ratio between primary and secondary is 1 to 1, the output level appearing at the terminal at point 30 will have the same level as the input supplied to terminal 11. Such a turns ratio of 1 to 1 therefor provides a method of completely isolating the primary input signal from the output signal without changing the level thereof. To the extent the turns ratio is other than 1 to 1, the ratio between input and output signal level also is thereby changed.

An A.C. square wave demodulating drive is applied between terminals 27 and 28 and in synchronism with the chopper drive signal applied between terminals 20 and 21. Both the rise times and the amplitudes are in phase so that transistor 23 is on when transistor 13 is on, and transistor 24 is on when transistor 14 is on. The circuit would also funciton with the square wave drive phased so that transistor 13 is on while transistor 24 is on, while transistor 14 is on while transistor 23 is on. In this case, however, the D.C. output will have a polarity inversion with respect to the D.C. input.

In the demodulation process, the sharp rise times applied through gate 23*b* of transistor 23 and gate 24*b* transistor 24 are capacitively coupled to the source and drain elements of the respective transistors. Illustratively, the positive spikes capacitively coupled through turned-off transistor 23 as a result of a positive-going demodulation drive at terminal 28, thereby appear at the undotted end of winding 15*g* and the dotted end of winding 15*e*. The positive spikes tend to cancel. So also the negative spikes capacitive coupled through turned-off transistor 24 to windings 15*f* and 15*h* also cancel. To the extent that complete cancellation by this manner is not effected, a further cancellation is afforded by the integrating action of capacitor 33.

In this manner the output appearing at point 30 of demodulation section 22 is substantially free from spikes resulting from the chopping and demodulating process.

Filter capacitator 33 further tends to smooth the full wave chopped D.C. at output 30. Output 30 is applied through multiplex switch transistor 34 to terminal 39.

When field effect switch 34 is turned on by an appropriate control signal supplied to terminal 40 and amplified by transistors 41 and 42, the output signal is transferred to terminal 39 and is thereby amplified by amplifier 35 and furnished to terminal 36. Many direct current isolators together with their multiplex switches 34 may be connected to terminal 39, and suitable control signals applied to select the desired signal for application to a common amplifier 35. In this manner a plurality of ungrounded low-level signals supplied to input terminals of each chopper-isolator may be multiplexed to a single amplifier 35 as desired.

What is claimed is:

1. A direct current isolator having input signal terminals connected thereto and output signal terminals connected therefrom comprising, an isolating transformer having a plurality of primary and a plurality of secondary windings with said secondary windings interconnected with said output terminals, first and second field effect transistors of complementary types and each symmetrically constructed and each having source, drain and gate elements with said gate elements responsive to a chopper drive signal and with the source element and the drain element of said first transistor connected to the ends of two of said primary windings in a manner that a signal introduced at both these two said ends tends to cancel, and with the source element and the drain element of said second transistor connected to the ends of another two of said primary windings in a manner that a signal introduced at both these two said ends of these remaining windings tends to cancel.

2. The direct current isolator of claim 1 with electrostatic shielding between said primary and said secondary windings.

3. The direct current isolator of claim 1 with solid state demodulating means interconnected with said secondary windings and with said output terminals.

4. The direct current isolator of claim 3 with a capacitance connected across said output terminals.

5. The direct current isolator of claim 4 wherein said transformer has four secondary windings interconnected with first and second field effect transistors of complementary types having their gate elements responsive to a demodulating drive signal.

6. The direct current isolator of claim 5 with each of said four primary windings having one-quarter of the primary turns and each of said four secondary windings having one-quarter of the secondary windings.

7. The direct current isolator of claim 1 with each of said four primary windings having one-quarter of the primary turns.

8. The direct current isolator of claim 1 with a capacitance connected across said output terminals.

References Cited

UNITED STATES PATENTS

| | | | |
|---|---|---|---|
| 3,305,756 | 2/1967 | Poss et al. | 331—113 X |
| 3,308,397 | 3/1967 | Morgan | 331—113 X |

NATHAN KAUFMAN, Pirmary Examiner

U.S. Cl. X.R.

330—30, 38; 307—240